(12) United States Patent
Korupp et al.

(10) Patent No.: US 11,867,292 B2
(45) Date of Patent: Jan. 9, 2024

(54) MECHANICAL SEAL DEVICE WITH MICROSYSTEM, PUMP DEVICE USING THE SAME AND METHOD OF OPERATING THE SAME

(71) Applicant: Herborner Pumpentechnik GmbH & Co KG, Herborn (DE)

(72) Inventors: Sascha Korupp, Asslar-Werdorf (DE); Florian Schneider, Herborn (DE); Lars Runte, Dillenburg-Frohnhausen (DE); Nils Reeh, Herborn (DE)

(73) Assignee: Herborner Pumpentechnik GmbH & Co KG, Herborn (DE)

( * ) Notice: Subject to any disclaimer, the term of this patent is extended or adjusted under 35 U.S.C. 154(b) by 339 days.

(21) Appl. No.: 16/594,289

(22) Filed: Oct. 7, 2019

(65) Prior Publication Data
US 2020/0124180 A1  Apr. 23, 2020

(30) Foreign Application Priority Data

Oct. 18, 2018 (DE) ...................... 10 2018 125 969.7
Dec. 17, 2018 (EP) ...................................... 18212870

(51) Int. Cl.
*F16J 15/34* (2006.01)
*F16J 15/02* (2006.01)
*G01M 13/005* (2019.01)

(52) U.S. Cl.
CPC ......... *F16J 15/3492* (2013.01); *F16J 15/022* (2013.01); *G01M 13/005* (2013.01)

(58) Field of Classification Search
CPC .... F16J 15/3492; F16J 15/022; G01M 13/005
See application file for complete search history.

(56) References Cited

U.S. PATENT DOCUMENTS 5,667,362 A * 9/1997 Murai ................. F04D 15/0218
  417/44.1
2010/0072706 A1* 3/2010 Schmitz ............... F16J 15/3444
  277/411

(Continued)

FOREIGN PATENT DOCUMENTS

DE        197 24 308       12/1998
DE    10 2015 226 311       6/2017

(Continued)

*Primary Examiner* — Manuel L Barbee
(74) *Attorney, Agent, or Firm* — Clark & Brody LP

(57) ABSTRACT

The invention concerns a mechanical seal device (1) with a mechanical seal (10) which comprises a dry-running protection device (20), the dry-running protection device (20) having at least one microsystem (21) which outputs a digital measured value (W), the microsystem (2) being arranged adjacent to the mechanical seal (10) and/or on and/or in the mechanical seal (10). The measured value (W) makes it possible to protect the mechanical seal (10) from overloads. Furthermore, the invention concerns a pump device (100) with such a mechanical seal device (1), the mechanical seal (10) being arranged in a shaft passage (102) and sitting on a pump shaft (103). Furthermore, the invention concerns a method of operating this pump device (100) in which the speed of a drive motor (105) of the pump shaft (103) is adapted on the basis of the digital measured value (W) of the microsystem (21).

12 Claims, 3 Drawing Sheets

(56) References Cited

U.S. PATENT DOCUMENTS

| | | | | |
|---|---|---|---|---|
| 2015/0270180 A1* | 9/2015 | Yang | ............... | H01L 21/823878 |
| | | | | 438/198 |
| 2016/0053698 A1* | 2/2016 | Fischer | ................ | G01J 5/0014 |
| | | | | 123/676 |
| 2017/0219152 A1* | 8/2017 | Petrou | ................ | F16L 27/0828 |
| 2019/0064364 A1* | 2/2019 | Boysel | ................ | G01S 7/4086 |
| 2019/0393816 A1* | 12/2019 | Chedygov | ............... | H02P 21/22 |

FOREIGN PATENT DOCUMENTS

| | | |
|---|---|---|
| DE | 10 2017 218 711 | 4/2019 |
| DE | 10 2017 128 566 | 6/2019 |
| EP | 2 362 122 A2 | 8/2011 |
| EP | 2 362 122 A3 | 10/2011 |
| GB | 2 395 532 | 5/2004 |

\* cited by examiner

MECHANICAL SEAL DEVICE WITH MICROSYSTEM, PUMP DEVICE USING THE SAME AND METHOD OF OPERATING THE SAME

FIELD OF THE INVENTION

The invention concerns a mechanical seal device and a method of operating the same.

BACKGROUND ART

Mechanical seals or so-called dynamic seals seal rotating shafts against a wall, e.g. of a machine housing or pump housing. The main components are two components sliding on each other, namely a sliding ring and a counter ring. The sliding ring or the counter ring is often spring-loaded in the direction of the other main component. One of the two rings sits rigidly in the stationary housing. The other of the two rings is secured against rotation on the rotating shaft and thus rotates with the shaft. A contact surface between the two rings forms the sealing zone.

A disadvantage of state-of-the-art technology is that these mechanical seals become hot under certain operating conditions, especially when the pumps run dry, in particular the elastomers used are thermally overloaded, wear out and in the worst case fail within a very short period of time. At the latest when the sealing effect decreases, a costly repair is necessary.

The object of the invention is therefore to create the prerequisites for the operational safety and service life of such a mechanical seal to be high, whereby the solution must be reliable, easy to handle, compact and inexpensive.

SUMMARY OF THE INVENTION

The invention concerns a mechanical seal device (also generally referred to as a device) with a mechanical seal and a dry-running protection device, the latter comprising at least one microsystem which outputs a digital measured value, the microsystem being located adjacent to the mechanical seal and/or on and/or in the mechanical seal.

With the aid of the digital measured value, operating states of the mechanical seal can be easily detected and evaluated, whereby the mechanical seal can be kept in non-critical operating states. This increases its service life. The use of a microsystem requires only a small installation space and is also inexpensive. The use of digital measured values also facilitates the connection to digital control units, because a digital measured value can be used without conversion.

In a preferred refinement, the microsystem features a MEMS chip. MEMS chips (microelectromechanical systems or micromachines) are tiny components that combine logic elements and/or micromechanical structures in a single chip. They can process mechanical and/or electrical information. Preferably, the micromechanical structures have a size of a few millimeters, in particular a maximum of 5 millimeters and preferably a maximum of 3 millimeters. Thanks to miniaturization, they can be manufactured inexpensively and in bulk. Such a MEMS chip may, for example, be arranged on a circuit board, in particular a printed circuit board. Preferably, the MEMS chip has one sensor for determining a measured value and in addition preferably at least two different sensors for determining two different measured values. Measurement errors caused by analog signal transmissions can thus be avoided.

According to an optional embodiment, the microsystem has a temperature sensor and the digital measured value is a temperature value. This allows overheating of the mechanical seal, which regularly precedes damage, to be detected in good time. This allows early reaction by adjusting operating parameters in order to prevent temperature-related damage to the mechanical seal. Due to the proximity of the mechanical seal to the decisive sealing gap and the usually very good thermal conductivity of its material, its temperature can be measured with high temporal resolution.

In a special variant, the temperature sensor is an optical sensor. Such a sensor can optically detect the temperature, in particular without contact with the measuring point, and in particular without contact with a measuring point on the mechanical seal. Such an optical temperature sensor could be placed in or on the rear wall of a pump, which is intended as an example of an installation location. From this position it would be possible to determine the temperature of a mechanical seal arranged in or on the rear wall of the pump. It is particularly preferred that the optical temperature sensor is part of a MEMS chip.

The microsystem may be assigned to a mechanical ring or a counter ring of the mechanical seal. The microsystem is preferably assigned to the static ring from the group of the sliding ring and the counter ring. This is technically easier to implement because, firstly, cable connections are also possible and, secondly, potential imbalances cannot be compensated. The assignment may optionally be an arrangement of the microsystem adjacent to the sliding ring and/or on and/or in the sliding ring and optionally adjacent to the counter ring and/or on and/or in the counter ring.

In a special variant, a measuring point of the temperature sensor is an area of the mechanical seal. This allows a direct temperature measurement to be made on the mechanical seal and temperature changes to be quickly detected without any major delay.

In another option of a refinement, the microsystem has a pressure sensor and the digital measured value is a pressure value acting on the mechanical seal. The determination of a pressure can indicate an impending overheating of the mechanical seal particularly early on, especially when the mechanical seal is used in pumps. This is so because changing pressures are often accompanied by changing lubrication behavior of the mechanical seal. In addition, pressure fluctuations lead directly to temperature changes in the pumped medium, which in turn affect the mechanical seal temperature.

In a further option of refinement, the microsystem has a humidity sensor and the digital measured value is a humidity value prevailing in the area of the mechanical seal. This makes it possible, for example, to anticipate already in advance an imminent overheating that could occur due to a lack of lubrication. A low humidity value is an indicator of inadequate lubrication. Due to the proximity of the mechanical seal to the relevant sealing gap, a leakage can also be detected very early on the basis of a humidity value. For this purpose, the humidity sensor is preferably located in an area between the sliding ring and the counter ring. The humidity value thus allows conclusions to be drawn about the condition of the mechanical seal. This is so because a high humidity value in this gap area can be an indicator of advanced wear of the mechanical seal.

If the microsystem has more than one sensor from the group of the temperature sensor, pressure sensor and humidity sensor, the output digital measured value comprises digital individual values for the temperature value, the pressure value and/or the humidity value.

Furthermore, the microsystem optionally has a wired and/or wireless data interface, for example Bluetooth, for outputting the digital measured value. This allows the measured values to be transmitted to an external receiver. The optional wireless data interface preferably shares the same circuit board with any sensors of the microsystem.

According to a particular embodiment, the microsystem is arranged encapsulated in the mechanical seal. This protects it from external influences and allows it to be used reliably even in aggressive environments.

Alternatively, the microsystem is arranged in an indentation or recess in the stationary counter ring of the mechanical seal, for example in a groove, for example in a ground groove. Here, the microsystem can be glued or locked in place. The microsystem is preferably recessed relative to a surface of the counter ring. This also makes the system suitable for retrofitting, as no additional installation space is required.

There are particular advantages if the microsystem has a power generator. This meets a prerequisite for self-sufficient operation.

In a special refinement, the power generator is an electrical generator based on induction, whereby induction is preferably effected by relative rotation between a sliding ring and a counter ring of the mechanical seal, alternatively between rotating shaft and stationary counter ring. This allows electricity to be generated without the need for external power sources.

In addition, there is the option of the microsystem having an energy storage device, preferably an accumulator. This means that a digital measured value can be output, at least briefly, even if the mechanical seal is not rotating.

In another variant, the microsystem is intended to have a wired power connection. This makes it possible to provide a particularly inexpensive and compact microsystem.

The invention also concerns a pump device with a pump housing in which a shaft passage is formed, with a pump shaft which projects rotationally into the shaft passage or is mounted rotationally in the shaft passage, and with a mechanical seal device as described above and below, whereby the mechanical seal is arranged in the shaft passage and sits on the pump shaft. Particularly in pumps, mechanical seals are lubricated and cooled with the medium to be pumped. The changing operating conditions of the pump and the medium to be pumped therefore affect the temperature and tightness of the mechanical seal. In this respect, the monitoring of the mechanical seal is of increased importance and the pump device can be protected against failures caused by damage to the mechanical seal. The pump is preferably a centrifugal pump. Such pumps operate at high speeds, so the dry-running protection as achieved with the dry-running protection device is of great importance.

It may optionally be provided that the microsystem interacts with a control of a drive motor of the pump shaft, in particular to control the speed of the drive motor, e.g. to a maximum permissible temperature at a measuring point on the mechanical seal. This allows the pump to continue the delivery task under reduced flow rate without damaging the mechanical seal. The control may be arranged on or in the pump housing. Alternatively, the control may also be arranged at a distance from the pump housing, e.g. a central or higher-level control.

According to a special embodiment, the microsystem is connected to a frequency converter of a drive motor of the pump shaft. This enables direct control of the drive motor and its speed.

For example, a special refinement provides that the speed of the drive motor of the pump shaft correlates with the digital measured value of the microsystem. This can be set up in such a way that normal operation takes place without regard to the measured values and an emergency run is activated for certain measured values.

In addition, the invention concerns a method of operating a pump device as described above and below, in which the speed of a drive motor of the pump shaft is adjusted on the basis of the digital measured value of the microsystem, in particular automatically. This allows the mechanical seal to be kept in non-critical operating conditions, giving it a long service life.

According to an option of the method, the digital measured value is a temperature value and the speed of the drive motor is reduced when a limit temperature is exceeded, preferably to the limit temperature. Reducing the speed results in less frictional heat on the mechanical seal. Damage to the sealing gap surfaces and elastomer elements of the mechanical seal can thus be avoided. By simply reducing the speed, the pumping process can be continued. This protects the pump from wearing restarts. In addition, operating conditions in which every restart of the pump at normal speed would immediately lead to the limit temperature being reached again can be avoided.

According to another method according to the invention of operation pump device as described above and below, it is provided that a vent valve is controlled on the basis of the digital measured value of the microsystem, in particular automatically, in order to vent a conveying chamber of the pump device. This allows the mechanical seal to be kept in non-critical operating conditions, giving it a long service life. Both a high temperature value and a low humidity value can be indicators of air in the conveying chamber.

Further features, details and advantages of the invention are derived from the wording of the claims as well as from the following description of exemplary embodiments on the basis of the drawings, in which

DETAILED DESCRIPTION OF THE INVENTION

Figure 1:
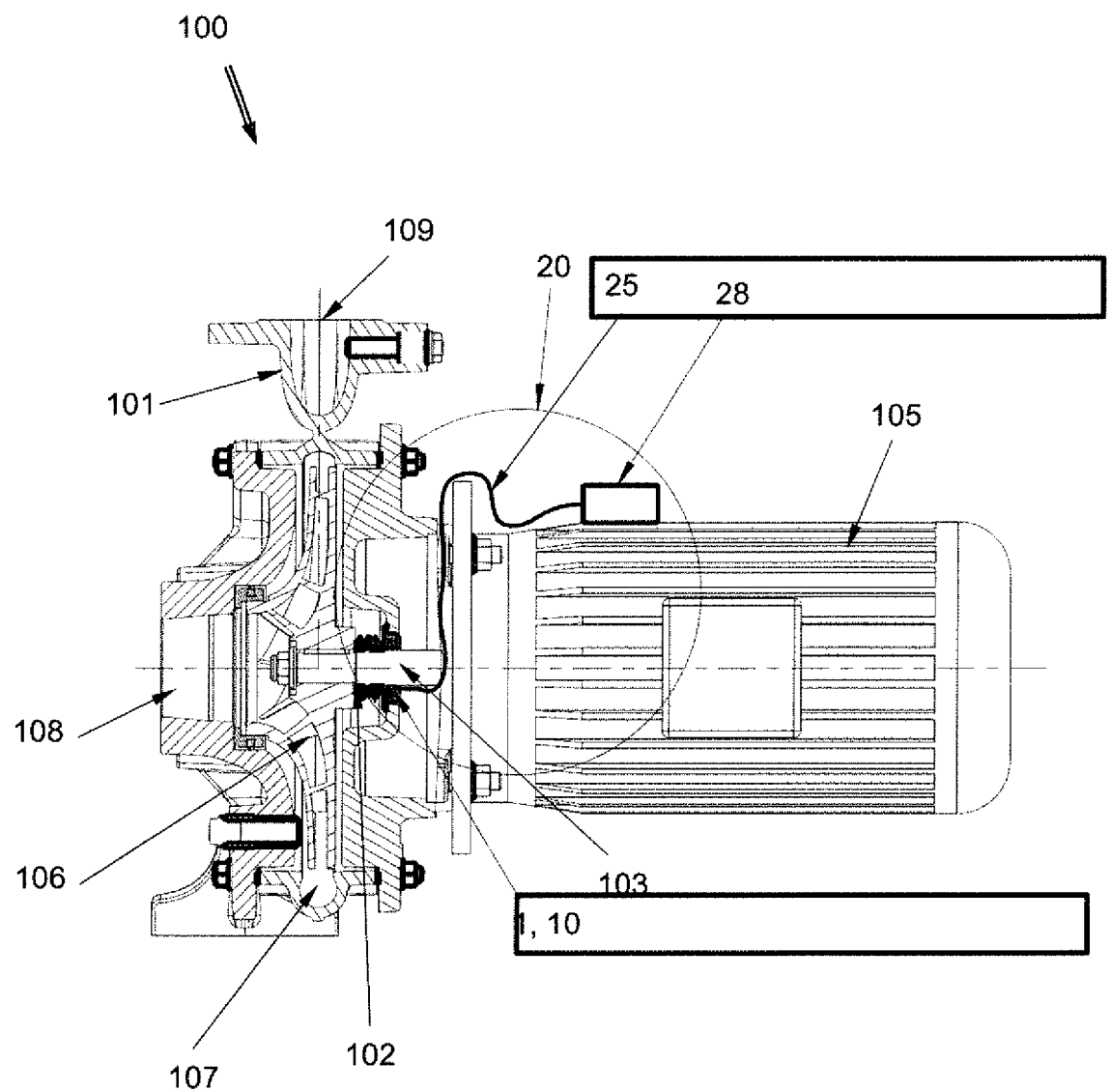
FIG. 1 shows a partial section through a pump device with a mechanical seal device.

FIG. 1 shows a pump device 100 with a pump housing 101 in which a shaft passage 102 is formed. A pump shaft 103 projects through the shaft passage 102 and is rotationally mounted here. The pump shaft 103 is connected on one side of the shaft passage 102 to a drive motor 105, with which the pump shaft 103 can be rotationally driven. On the other side of the shaft passage 102, the pump shaft 103 is connected for conjoint rotation to a pump impeller 106, which is rotationally arranged in a conveying chamber 107 of the pump housing 101. As a function of its revolutions, the pump impeller 106 delivers a fluid between two openings 108, 109, namely from an inlet on the suction side (first opening 108) and to an outlet on the pressure side (second opening 109), each of which forms a flow connection which opens through the pump housing 101 into the conveying chamber 107. In this case, the pump impeller 106 is therefore able in particular to pump a fluid from the inlet on the suction side (first opening 108) to the outlet on the pressure side (second opening 109). The speed of rotation of the pump impeller 106 depends on the drive motor 105, which can be adjusted in terms of its speed by means of a frequency converter.

Such a pump device 100 can now optionally be equipped in each case with the individually described variants of the mechanical seal device. A possible variant is described in more detail below.

The pump device 100 according to FIG. 1 also has a mechanical seal device 1, which in turn has a mechanical seal 10 arranged in the shaft passage 102. The mechanical seal 10 seals the rotational pump shaft 103 against the pump housing 101. The mechanical seal 10 is located on the pump shaft 103 for this purpose. This special arrangement of the mechanical seal 10 can in turn have the optional features described below. Such optional features can be seen in particular in the enlarged section as shown in FIG. 2.

Figure 2:
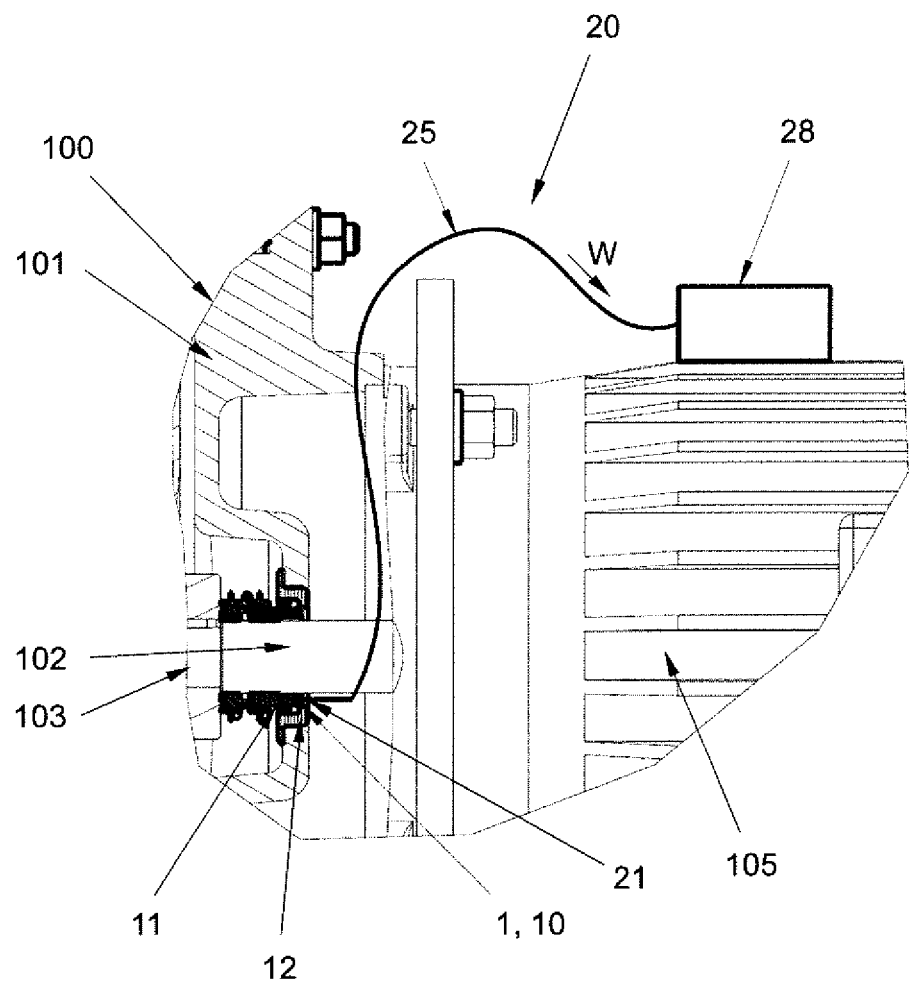
FIG. 2 shows an enlargement of a section of the pump device as shown in FIG. 1.

As can be seen especially in FIG. 2, the mechanical seal device 1 has a dry-running protection device 20 with a microsystem 21, which outputs a digital measured value W to an evaluation unit 28 via a data interface 25, in particular a cable line. For this, the microsystem 2 can be arranged adjacent to the mechanical seal 10 and/or on and/or in the mechanical seal 10.

According to the optional variant shown in FIG. 2, the microsystem 21 is indirectly connected to the frequency converter of the drive motor 105 of the pump shaft 103 via the evaluation unit 28 arranged at a distance (alternatively, connections with other control or monitoring devices are also possible). This enables the speed of the drive motor 105 of the pump shaft 103 to be correlated by the control system with the digital measured value W of the microsystem 21.

The optional cable line used here, which includes the data interface 25, also forms a wired power connection for the microsystem 21.

The microsystem 21 is arranged here on a stationary counter ring 12 of the mechanical seal 10, which corresponds to a sliding ring 11 mounted for conjoint rotation on the rotatable pump shaft 103.

In the case of wireless data interfaces 25 in particular, however, an arrangement of the microsystem 21 on the sliding ring 11 can also be optionally considered.

Figure 3:
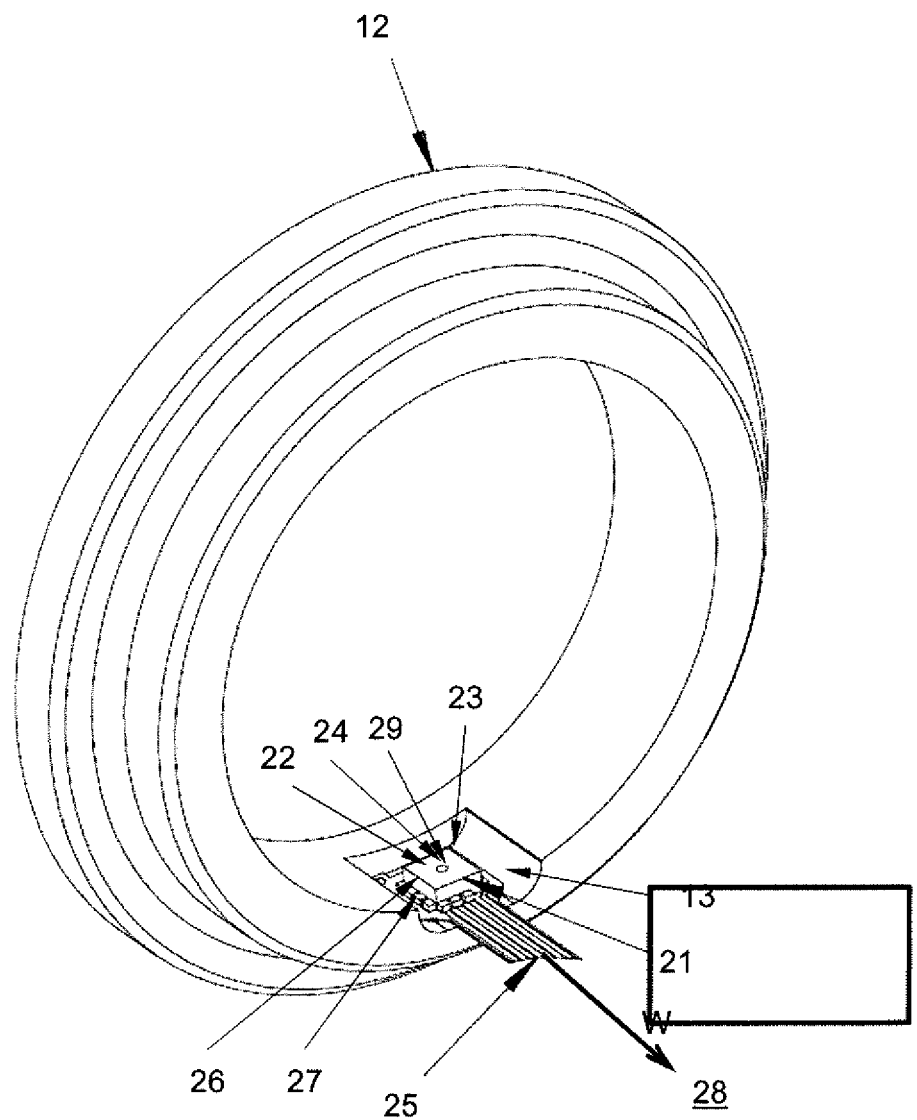
FIG. 3 shows a counter ring of a mechanical seal with a microsystem.

A possible refinement of the counter ring 12 with the microsystem 21 is shown in FIG. 3. Here it can be seen that the microsystem 21 is arranged in a recess 13 in the counter ring 12. In particular, it does not protrude from the recess 13. In particular, the microsystem 21 has a MEMS chip 26 on a circuit board 27. Integrated in this MEMS chip 26 of the microsystem 21 either together or individually are:
 a temperature sensor 22, whose digital measured value W is a temperature value;
 a pressure sensor 24, whose digital measured value W is a pressure value acting on the mechanical seal 10;
 a humidity sensor 29, whose digital reading W is a humidity value prevailing in the area of the mechanical seal 10.

The MEMS chip 26 thus respectively forms a measuring point 23 for the temperature sensor 22, the pressure sensor 24 and the humidity sensor 29 in an area of the mechanical seal 10. The measured value W of the various sensors is output in each case via the data interface 25 to the separately arranged evaluation unit 28 (see also FIGS. 1 and 2).

Such an arrangement enables a method in which the speed of the drive motor 105 of the pump shaft 103 is adapted on the basis of the digital measured value W of the microsystem 21. This method may include, for example:
 a reduction in the speed of the drive motor 105 if the temperature value exceeds a limit temperature;
 an increase in the speed of the drive motor 105 if the temperature value falls below the limit temperature;
 a reduction or increase in the speed as a function of the measured humidity value; and
 a reduction or increase in the speed as a function of the measured pressure value.

The invention is not limited to one of the embodiment described above, but can be modified in many ways.

For example, the microsystem 21 may optionally be equipped with a wireless data interface 25 for outputting the digital measured value W instead of the wired data interface 25.

There is also the option of powering the microsystem 21 wirelessly. This opens up the option of arranging the microsystem 21 completely encapsulated in the mechanical seal 10, in particular the counter ring 12 or the sliding ring 11.

For a wireless power supply, the microsystem 21 should have a power generator, especially also in micro construction. For example, such a power generator could be an induction-based electrical generator. The induction is preferably caused by the relative rotation between the sliding ring 11 and the counter ring 12 of the mechanical seal 10, because as a result the mechanical seal 10 as a unit has all the functionally necessary refinement features. Alternatively, the induction may also be effected between the rotating pump shaft 103 and the stationary counter ring 12.

To ensure that a measured value W is also available when the pump shaft 103 is at a standstill, it is advisable to equip the microsystem 21 with an energy accumulator, especially also in micro construction, for example an accumulator or an electrical capacitor. In the optional combination with the power generator, this energy accumulator can be charged regularly.

All features and advantages arising from the claims, description and drawing, including design details, spatial arrangements and method steps, may be essential to the invention, both in themselves and in a variety of combinations.

Reference number list

1 Mechanical seal device
 10 Mechanical seal
 11 Sliding ring
 12 Counter ring
 13 Recess
 20 Dry-running protection device
 21 Microsystem
 22 Temperature sensor
 23 Measuring point
 24 Pressure sensor
 25 Data interface
 26 MEMS chip
 27 Circuit board
 28 Evaluation unit
 29 Humidity sensor
 100 Pump device
 101 Pump housing
 102 Shaft passage
 103 Pump shaft
 105 Drive motor
 106 Pump impeller
 107 Conveying chamber
 108 Opening or inlet on suction side
 109 Opening or outlet on pressure side
 W digital measured value

The invention claimed is:

1. A mechanical seal device (1) with a mechanical seal (10), which comprises a dry-running protection device (20), the dry-running protection device (20) having at least one microsystem (21) which outputs a digital measured value (W) being a temperature value, the microsystem (21) having:
   a temperature sensor (22),
   a wireless data interface for outputting the digital measured value (W), and
   a micro constructed power generator,
   the microsystem (21) further comprising a circuit board (27) and an MEMS chip (26), the MEMS chip (26) being arranged on a circuit board (27), the MEMS chip (26) comprising the temperature sensor (22) for determining the measured value (W), the wireless data interface sharing the circuit board (27) with the temperature sensor (22),
   the microsystem (21) with the temperature sensor (22), the wireless data interface, and micro constructed power generator, the MEMS chip (26), and the circuit board being arranged on and/or in the mechanical seal (10), wherein the microsystem is assigned to a sliding ring (11) or a counter ring (12) of the mechanical seal (10) and wherein the assignment is an arrangement of the microsystem (21):
   a) on and/or in the sliding ring (11); or
   b) on and/or in the counter ring (12).

2. The mechanical seal device (1) as claimed in claim 1, wherein the microsystem (21) has a humidity sensor (29) and a digital measured value (W) for the humidity sensor (29) is a humidity value prevailing in the area of the mechanical seal (10).

3. The mechanical seal device (1) as claimed in claim 1, wherein the microsystem (21) has a pressure sensor (24) and a digital measured value (W) for the pressure sensor (24) is a pressure value acting on the mechanical seal (10).

4. The mechanical seal device (1) as claimed in claim 1, wherein the microsystem (21) has a wired data interface (25) for outputting the digital measured value (W).

5. The mechanical seal device (1) as claimed in claim 1, wherein the microsystem (21) is arranged encapsulated in the mechanical seal (10).

6. The mechanical seal device (1) as claimed in claim 1, wherein the microsystem (21) has an energy accumulator.

7. The mechanical seal device (1) as claimed in claim 1, wherein the microsystem (21) has a wired power connection.

8. A pump device (100) with a pump housing (101), in which a shaft passage (102) is formed,
   with a pump shaft (103), which projects rotationally into the shaft passage (102), and
   with a mechanical seal device (1) as claimed in claim 1, the mechanical seal (10) being arranged in the shaft passage (102) and sitting on the pump shaft (103).

9. The pump device (100) as claimed in claim 8, wherein the microsystem (21) is connected to a frequency converter of a drive motor (105) of the pump shaft (103).

10. The pump device (100) as claimed in claim 9, wherein the speed of the drive motor (105) of the pump shaft (103) correlates with the digital measured value (W) of the microsystem (21).

11. A method of operating a pump device (100) as claimed in claim 8, in which the speed of a drive motor (105) of the pump shaft (103) is adapted on the basis of the digital measured value (W) of the microsystem (21).

12. The method as claimed in claim 11, whereby the speed of the drive motor (105) is reduced when a limit temperature is exceeded.

* * * * *